United States Patent
Kim et al.

(10) Patent No.: US 9,941,945 B2
(45) Date of Patent: Apr. 10, 2018

(54) METHOD FOR PERFORMING MOBILITY-BASED BEAMFORMING IN WIRELESS COMMUNICATION SYSTEM, AND APPARATUS THEREFOR

(71) Applicant: LG ELECTRONICS INC., Seoul (KR)

(72) Inventors: Kitae Kim, Seoul (KR); Heejin Kim, Seoul (KR); Kilbom Lee, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/316,820

(22) PCT Filed: Jun. 25, 2014

(86) PCT No.: PCT/KR2014/005640
§ 371 (c)(1),
(2) Date: Dec. 6, 2016

(87) PCT Pub. No.: WO2015/199256
PCT Pub. Date: Dec. 30, 2015

(65) Prior Publication Data
US 2017/0134079 A1    May 11, 2017

(51) Int. Cl.
*H04B 7/04* (2017.01)
*H04B 7/0456* (2017.01)

(52) U.S. Cl.
CPC ......... *H04B 7/0456* (2013.01); *H04B 7/0421* (2013.01)

(58) Field of Classification Search
CPC .............................. H04B 7/0456; H04B 7/0421
See application file for complete search history.

(56) References Cited

U.S. PATENT DOCUMENTS

2006/0270434 A1   11/2006   Iacono
2008/0045143 A1*   2/2008   Yoshida ................ H04W 16/28
                                                                        455/7

(Continued)

FOREIGN PATENT DOCUMENTS

KR    1020130017572    2/2013
KR    1020140066484    6/2014

OTHER PUBLICATIONS

PCT International Application No. PCT/KR2014/005640, Written Opinion of the International Searching Authority dated Feb. 23, 2015, 15 pages.

*Primary Examiner* — Kenneth Lam
(74) *Attorney, Agent, or Firm* — Lee Hong Degerman Kang & Waimey

(57) ABSTRACT

Disclosed in the present invention is a method for a transmitting end transmitting a signal in a wireless communication system. Specifically, the method comprises the steps of: transmitting, to a receiving end, a first reference signal for providing a reference beam which is equal in all directions, and a second reference signal for providing a boundary beam which heads toward a pre-set direction; receiving, from the receiving end, feedback information on the difference value between the reference beam gain and the boundary beam gain; estimating the mobility information of the receiving end on the basis of the amount of change in the difference value; and, by using the mobility information, performing beamforming for transmitting a signal to the receiving end.

10 Claims, 13 Drawing Sheets

(56) References Cited

U.S. PATENT DOCUMENTS

| | | | |
|---|---|---|---|
| 2009/0225716 A1 | 9/2009 | Chen et al. | |
| 2010/0246476 A1* | 9/2010 | Hethuin | H04W 16/28 370/315 |
| 2010/0317292 A1 | 12/2010 | Takatani et al. | |
| 2013/0039345 A1* | 2/2013 | Kim | H04W 72/046 370/332 |
| 2013/0059619 A1* | 3/2013 | Kim | H04W 72/046 455/509 |
| 2013/0072247 A1* | 3/2013 | Park | H04B 7/0408 455/513 |
| 2013/0170572 A1* | 7/2013 | Asplund | H04B 7/0456 375/267 |
| 2013/0301454 A1* | 11/2013 | Seol | H04B 7/043 370/252 |
| 2013/0301567 A1* | 11/2013 | Jeong | H04W 74/0833 370/329 |
| 2014/0146863 A1* | 5/2014 | Seol | H04B 7/0456 375/224 |
| 2017/0134083 A1* | 5/2017 | Kim | H04B 7/0617 |
| 2017/0201893 A1* | 7/2017 | Seol | H04W 16/28 |
| 2017/0207845 A1* | 7/2017 | Moon | H04B 7/088 |

\* cited by examiner

METHOD FOR PERFORMING MOBILITY-BASED BEAMFORMING IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2014/005640, filed on Jun. 25, 2014, the contents of which are all hereby incorporated by reference herein in their entirety.

TECHNICAL FIELD

The present invention relates to a wireless communication system, and more particularly, to a method of performing beamforming in a wireless communication system and an apparatus therefor.

BACKGROUND ART

A legacy beamforming technique using multiple antennas can be mainly classified into an analog beamforming technique and a digital beamforming technique depending on a location to which a beamforming weight vector/precoding vector is applied.

First of all, the analog beamforming technique is a typical beamforming technique applied to an initial multi-antenna structure. The analog beamforming technique divides an analog signal of which digital signal processing is completed into a plurality of paths and sets phase-shift (PS) and power amplification (PA) to each of a plurality of the paths to perform beamforming. FIG. 1 is a diagram for an example of a legacy analog beamforming technique.

Referring to FIG. 1, it is able to see a structure that an analog signal derived from a single digital signal is processed by a power amplifier and a phase shifter connected to each antenna to perform analog beamforming. In particular, the phase shifter and the power amplifier process complex weights at an analog stage. In this case, a radio frequency (RF) chain corresponds to a processing block in which a single digital signal is converted into an analog signal.

However, according to the analog beamforming technique, since accuracy of a beam is determined according to characteristics of elements of the phase shifter and the power amplifier, the analog beamforming technique is advantageous for the narrow band transmission due to the control characteristics of the elements. On the other hand, since the analog beamforming technique has a hardware structure incapable of implementing multi-stream transmission, multiplexing gain for increasing a transmission rate is relatively small and it is difficult to perform beamforming per user based on orthogonal resource allocation.

Unlike the analog beamforming technique, the digital beamforming technique performs beamforming at a digital stage using a baseband process to maximize diversity and multiplexing gain in MIMO environment.

Referring to FIG. 2, digital beamforming can be performed by performing precoding in a baseband process. Unlike FIG. 1, an RF chain includes a power amplifier. This is because a complex weight derived for beamforming is directly applied to a transmission data.

And, since the digital beamforming technique is able to differently perform beamforming according to a user, it is able to support multi user beamforming at the same time. Since the digital beamforming technique is able to perform independent beamforming according to a user to which an orthogonal resource is allocated, the digital beamforming technique has characteristics that scheduling flexibility is high and it is able to manage a transmitting end in accordance with a system purpose. Moreover, when a technique such as Multiple-Input Multiple-Output (MIMO)-OFDM (Orthogonal Frequency Division Multiplexing) is applied in a broadband transmission environment, it may form an independent beam for each subcarrier. Therefore, the digital beamforming technique can maximize the maximum transmission rate of a single user based on increased system capacity and enhanced beam gain.

In accordance with the aforementioned advantages and disadvantages, digital beamforming-based MIMO technology has been introduced in the current 3G/4G system.

DISCLOSURE OF THE INVENTION

Technical Task

Based on the aforementioned discussion, a method of performing mobility-based beamforming in a wireless communication system and an apparatus therefor are proposed in the following.

Technical Solution

To achieve these and other advantages and in accordance with the purpose of the present invention, as embodied and broadly described, according to one embodiment, a method of transmitting a signal, which is transmitted by a transmitting end in a wireless communication system, includes the steps of transmitting a first reference signal for providing a reference beam uniform in all directions and a second reference signal for providing a boundary beam heading towards a predetermined direction to a receiving end, receiving feedback information on a difference value between a gain of the reference beam and a gain of the boundary beam from the receiving end, estimating mobility information of the receiving end based on a change amount of the difference value, and performing beamforming for transmitting a signal to the receiving end using the mobility information.

In this case, it may be preferable that the difference value between the gain of the reference beam and the gain of the boundary beam is equal to or greater than a threshold value. Or, it may be preferable that the feedback information is periodically received from the receiving end irrespective of the threshold value.

More preferably, the difference value between the gain of the reference beam and the gain of the boundary beam is linearized by applying a weight value to the difference based on the predetermined direction.

In addition, the beamforming performing step includes the step performing beamforming in a direction to which the receiving end moves by controlling a phase shifter and a power amplifier included in an antenna of the transmitting end.

To further achieve these and other advantages and in accordance with the purpose of the present invention, according to a different embodiment, a method of receiving a signal, which is received by a receiving end in a wireless communication system, includes the steps of receiving a first reference signal for providing a reference beam uniform in all directions and a second reference signal for providing a boundary beam heading towards a predetermined direction from a transmitting end, transmitting feedback information on a difference value between a gain of the reference beam and a gain of the boundary beam to the transmitting end, and receiving a signal beamformed based on mobility information of the receiving end from the transmitting end. In this case, the mobility information is estimated by the transmitting end based on the feedback information.

In this case, if the difference value between the gain of the reference beam and the gain of the boundary beam is equal to or greater than a threshold value, the feedback information transmitting step includes the step of transmitting the feedback information on the difference value to the transmitting end. Or, the feedback information is periodically transmitted from the transmitting end irrespective of the threshold value.

Meanwhile, the method can further include the step of applying a weight value to the difference value between the gain of the reference beam and the gain of the boundary beam. In this case, the weight value is determined based on the predetermined direction.

In addition, the beamformed signal is obtained by performing beamforming in a direction to which the receiving end moves by controlling a phase shifter and a power amplifier contained in a transmission antenna of the transmitting end.

Advantageous Effects

According to embodiment of the present invention, it is able to perform signal transmission and reception optimized to a wireless channel situation using a mobility-based hybrid beamforming technique.

It will be appreciated by persons skilled in the art that that the effects that can be achieved through the present invention are not limited to what has been particularly described hereinabove and other advantages of the present invention will be more clearly understood from the following detailed description.

BEST MODE

Mode for Invention

The configuration, operation and other features of the present invention will be understood by the embodiments of the present invention described with reference to the accompanying drawings.

Hereinafter, a Multiple-Input Multiple-Output (MIMO) system will be described. In the MIMO system, multiple transmission antennas and multiple reception antennas are used. By this method, data transmission/reception efficiency can be improved. That is, since a plurality of antennas is used in a transmitter or a receiver of a wireless communication system, capacity can be increased and performance can be improved. Hereinafter, MIMO may also be called "multi-antenna".

In the multi-antenna technique, a single antenna path is not used for receiving one message. Instead, in the multi-antenna technique, data fragments received via several antennas are collected and combined so as to complete data. If the multi-antenna technique is used, a data transfer rate may be improved within a cell region having a specific size or system coverage may be increased while ensuring a specific data transfer rate. In addition, this technique may be widely used in a mobile communication terminal, a repeater and the like. According to the multi-antenna technique, it is possible to overcome a limit in transmission amount of conventional mobile communication using a single antenna.

Figure 1:
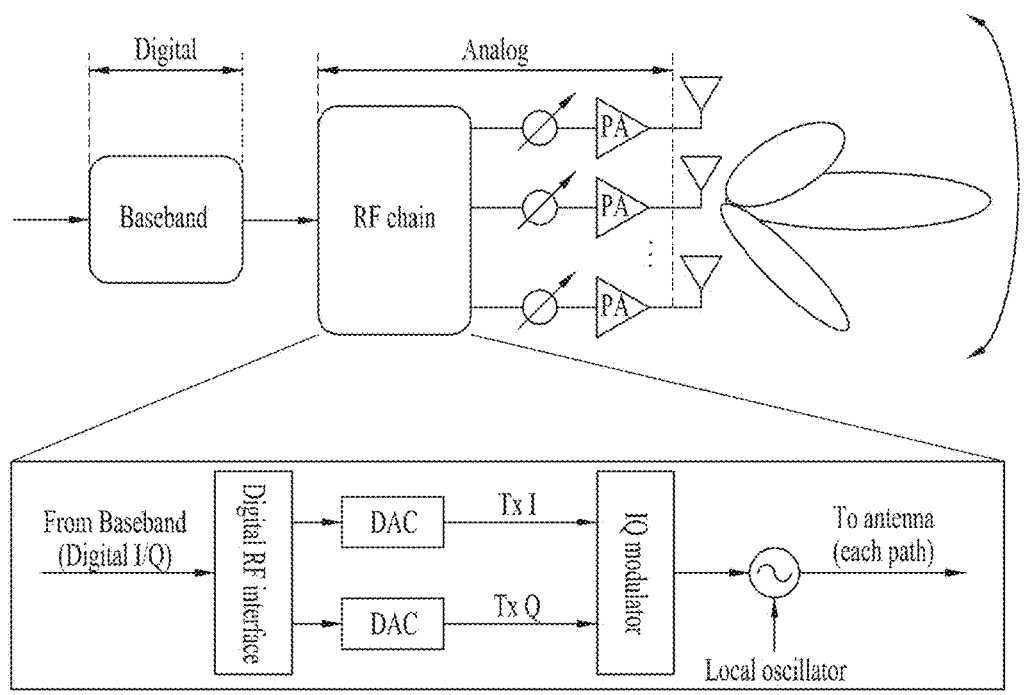
FIG. 1 is a diagram for an example of a legacy analog beamforming technique.
Figure 2:
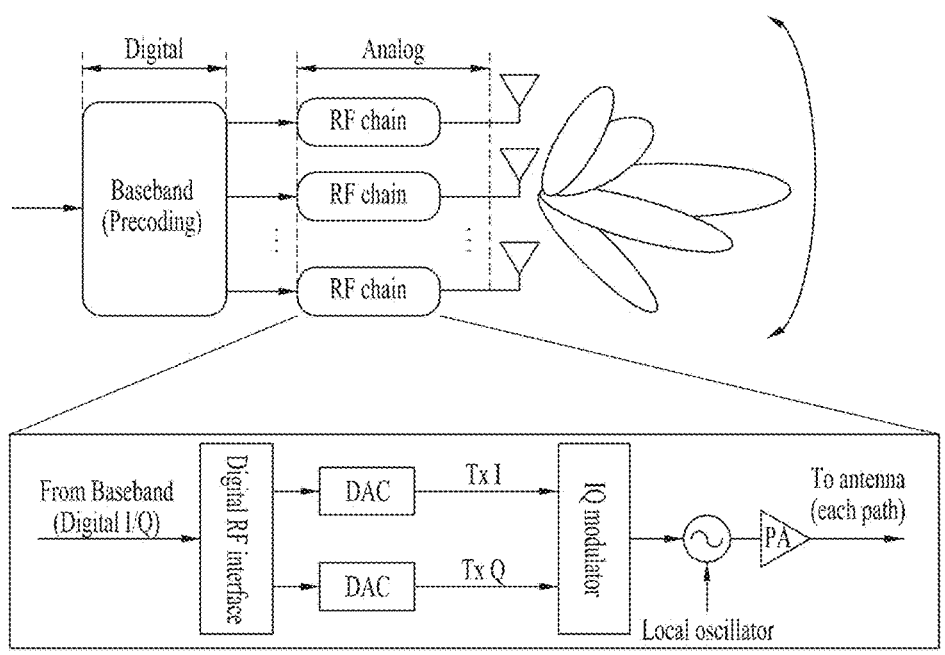
FIG. 2 is a diagram for an example of a legacy digital beamforming technique.
Figure 3:
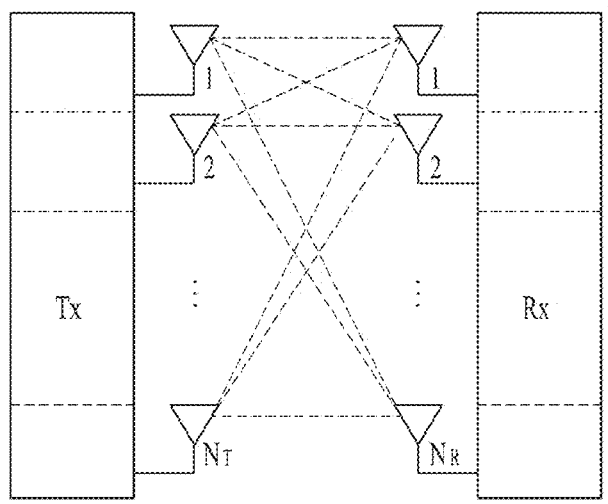
FIG. 3 is a diagram showing the configuration of a general multiple input multiple output (MIMO) system.

The configuration of the general multi-antenna (MIMO) communication system is shown in FIG. 3. $N_T$ transmission antennas are provided in a transmitter and $N_R$ reception antennas are provided in a receiver. If the multiple antennas are used in both the transmitter and the receiver, theoretical channel transmission capacity is increased as compared with the case where multiple antennas are used in only one of the transmitter or the receiver. The increase in the channel transmission capacity is proportional to the number of antennas. Accordingly, transfer rate is improved and frequency efficiency is improved. If a maximum transfer rate in the case where one antenna is used is $R_o$, a transfer rate in the case where multiple antennas are used can be theoretically increased by a value obtained by multiplying $R_o$ by a rate increase ratio $R_i$ as shown in Equation 1 below. Here, $R_i$ is the smaller of the two values $N_T$ and $N_R$.

$$R_i = \min(N_T, N_R) \qquad \text{[Equation 1]}$$

For example, in a MIMO system using four transmit antennas and four reception antennas, it is possible to theoretically acquire a transfer rate which is four times that of a single antenna system. After the theoretical increase in the capacity of the MIMO system was proved in the mid-1990s, various technologies of substantially improving a data transmission rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. As shown in FIG. 3, it is assumed that $N_T$ transmit antennas and $N_R$ reception antennas are present. In transmitted signals, if the $N_T$ transmit antennas are present, the number of pieces of maximally transmittable information is $N_T$. The transmitted information may be expressed by a vector shown in Equation 2 below.

$$s = [s_1, s_2, \ldots, s_{N_T}]^T \quad \text{[Equation 2]}$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed by a vector shown in Equation 3 below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T$$

In addition, $\hat{s}$ may be expressed using a diagonal matrix $P$ of the transmit powers as shown in Equation 4 below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Considers that the $N_T$ actually transmitted signals $x_1, x_2, \ldots, x_{N_T}$ are configured by applying a weight matrix $W$ to the information vector $\hat{s}$ with the adjusted transmit powers. The weight matrix serves to appropriately distribute the transmitted information to each antenna according to a transport channel state, etc. Such transmitted signals $x_1, x_2, \ldots, x_{N_T}$ may be expressed by using a vector $X$ as shown in Equation 5 below. $W_{ij}$ denotes a weight between an i-th transmit antenna and j-th information. $W$ is also called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In general, the physical meaning of the rank of the channel matrix may be a maximum number of elements capable of transmitting different information via a given channel. Accordingly, since the rank of the channel matrix is defined as the smaller of the number of independent rows or columns, the rank of the matrix is not greater than the number of rows or columns. The rank rank(H) of the channel matrix H is mathematically expressed by Equation 6.

$$\text{rank}(H) \leq \min(N_T, N_R) \quad \text{[Equation 6]}$$

In addition, different information transmitted using the MIMO technology is defined as "transmitted stream" or "stream". Such "stream" may be referred to as "layer". Then, the number of transmitted streams is not greater than the rank which is a maximum number capable of transmitting different information. Accordingly, the channel rank H is expressed by Equation 7 below.

$$\text{\# of streams} \leq \text{rank}(H) \leq \min(N_T, N_R) \quad \text{[Equation 7]}$$

where, "# of streams" denotes the number of streams. It should be noted that one stream may be transmitted via one or more antennas.

There are various methods for associating one or more streams with several antennas. These methods will be described according to the kind of the MIMO technology. A method of transmitting one stream via several antennas is referred to as a spatial diversity method and a method of transmitting several streams via several antennas is referred to as a spatial multiplexing method. In addition, a hybrid method which is a combination of the spatial diversity method and the spatial multiplexing method may be used.

In the following, a massive MIMO environment in which the number of transmission and reception antennas is considerably increased is explained. In general, in cellular communication, it is assumed that maximum 8 transmission/reception antennas are applied to a MIMO environment. However, as evolving into massive MIMO, the number of antennas may increase more than dozens or several hundreds of antennas.

If a digital beamforming technique is applied in a massive MIMO environment, since it is necessary to perform signal processing on hundreds of antennas for digital signal processing of a transmitting end through a baseband process, signal processing complexity becomes very complex and hardware implementation complexity becomes very complex because RF chains as many as the number of antennas are necessary. In addition, since it is necessary to perform independent channel estimation on all antennas and have feedback information on a huge MIMO channel consisting of all antennas in case of a FDD (frequency division duplex) system, a pilot and a feedback overhead become very big. On the other hand, if an analog beamforming technique is applied in the massive MIMO environment, hardware complexity of a transmitting end is relatively low, but performance enhancement using multiple antennas is insignificant and flexibility of resource allocation is degraded. In particular, in case of performing broadband transmission, it is very difficult to control a beam according to a frequency.

Therefore, in the massive MIMO environment, it is necessary to have a scheme of configuring a transmitting end of a hybrid type that an analog beamforming structure and a digital beamforming structure are combined instead of exclusively selecting one of the analog beamforming and the digital beamforming techniques Table 1 in the following shows relationship between a performance gain and complexity of the analog beamforming technique and the digital beamforming technique. It is necessary to design a structure of a transmitting end of a hybrid type capable of reducing the hardware implementation complexity of the transmitting end and maximizing a beamforming gain using the massive antenna based on the relationship.

TABLE 1

| | Easy of beamforming accuracy control | Multi-carrier beam control | Multi-stream transmission | Hardware complexity (BB process) | Pilot and feedback overhead |
|---|---|---|---|---|---|
| Analog beamforming technique | low | impossible or difficult | impossible or difficult | low | low |
| Digital beamforming technique | high | possible | possible | high | high |

In the following, hybrid beamforming is explained in more detail.

Figure 4:
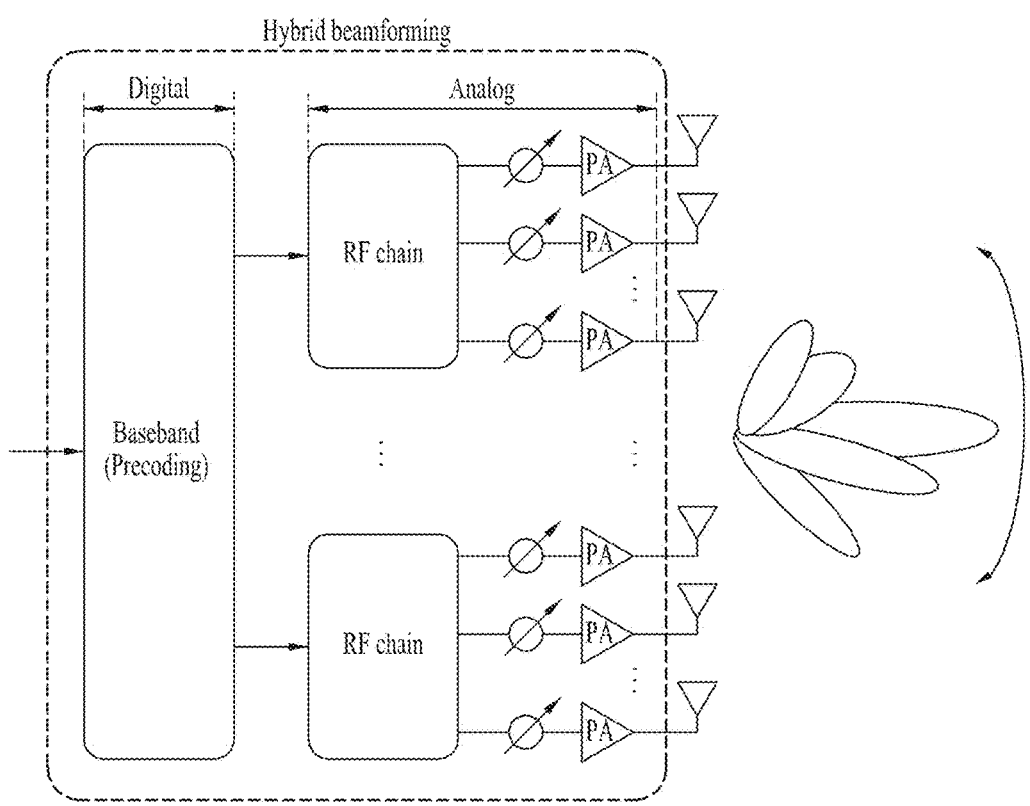
FIG. 4 is a diagram for explaining a concept of hybrid beamforming.

The hybrid beamforming is performed to configure a transmitting end capable of reducing hardware complexity and achieving characteristics of the analog beamforming technique and advantages of the digital beamforming technique. FIG. 4 is a diagram for explaining a concept of hybrid beamforming.

Referring to FIG. 4, the hybrid beamforming is a structure that performs coarse beamforming using the analog beamforming technique and performs multi-stream or multi-user transmission using the digital beamforming technique. Consequently, the hybrid beamforming has a structure for simultaneously performing the analog beamforming technique and the digital beamforming technique to lower implementation complexity of a transmitting end or hardware complexity. Basically, technical issues of the hybrid beamforming are described in the following.

Optimization considering both analog and digital beamforming at the same time has the following difficulties. Basically, the digital beamforming has an identical time-frequency resource and can apply an independent beamforming technique to each user. On the contrary, the analog beamforming has a limitation that it is necessary to apply a common beamforming technique with an identical time-frequency resource. Hence, the limitation causes such an optimization constraint as the number of supported ranks, beam control flexibility, beamforming decomposition, and the like.

The analog beamforming technique, which forms a beam only in a specific direction in the same time-frequency resource, is unable to perform multiple beamforming in all UEs directions at the same time. Hence, there is a problem that it is impossible to simultaneously transmit a UL/DL control channel, a reference signal, a synchronization signal, and the like to all UEs capable of being distributed to all areas of a cell.

In case of performing estimation on an analog/digital beam, although the digital beam is able to use a legacy orthogonal pilot allocation scheme as it is, the analog beam requires a predetermined time-duration as many as the number of beam candidates. This means that time delay required for the analog beam estimation is not small. And, if the analog beam and the digital beam are estimated at the same time, complexity can be considerably increased.

Lastly, while the digital beamforming technique is able to easily perform beamforming for multi-user/stream, the analog beamforming technique performs same beamforming on the entire transmission band. Hence, it is difficult to perform independent beamforming according to a user or a stream. In particular, since it is difficult to support FDMA (e.g., OFDMA) through orthogonal frequency resource allocation, it may be difficult to achieve optimization of frequency resource efficiency.

Among the aforementioned technical issues, an object of the present invention is to provide a method capable of solving analog/digital beam estimation complexity for hybrid beamforming.

Figure 5:
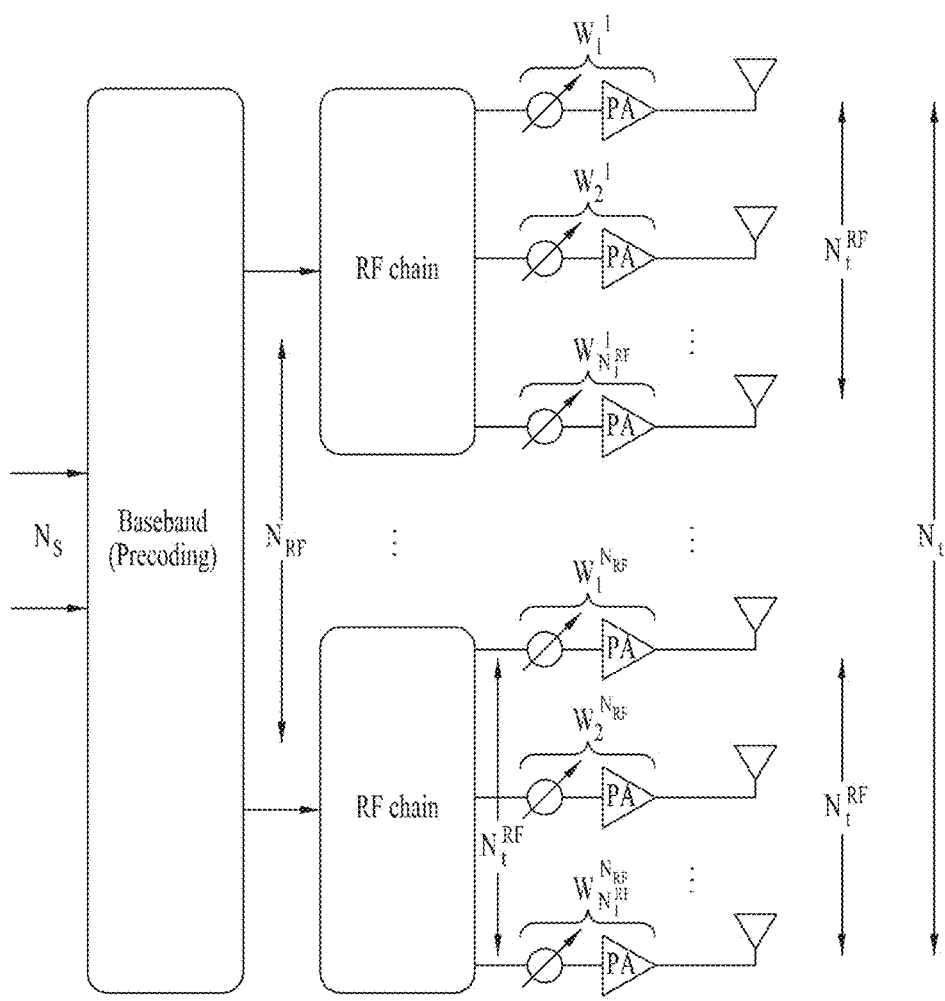
FIG. 5 is a diagram for a structure of a transmitting end that performs hybrid beamforming.

FIG. 5 is a diagram for a structure of a transmitting end that performs hybrid beamforming. In particular, in FIG. 5, assume that the transmitting end performing hybrid beamforming is equipped with $N_t^{RF}$ number of independent antennas only according to an RF chain.

In this case, such a relationship as $N_t = N_t^{RF} \times N_{RF}$ established between the number of all antennas and the number of antennas according to an RF chain. Since a signal, which has passed a phase shifter and a power amplifier, is independently transmitted to a transmission antenna at the end, it may assume such a system model as equation 8 in the following.

$$y_k = H_k F^{RF} F_k^{BB} s_k + z_k \quad \text{[Equation 8]}$$

In equation 8, $y_k$ corresponds to a reception signal vector ($N_r \times 1$) on a subcarrier where an index corresponds to k, $H_k$ corresponds to a $N_r \times N_t$ channel matrix on a subcarrier where an index corresponds to k, $F^{RF}$ corresponds to an RF precoder having a size of $N_t \times N_t$ on all subcarriers, and the RF precoder is identically applied to all subcarriers. Moreover, $F_k^{BB}$ corresponds to a baseband precoder having a size of $N_{RF} \times N_S$ on a subcarrier where an index corresponds to k and the baseband precoder can be changed according to a subcarrier. In addition, $s_k$ corresponds to a transmission signal vector ($N_S \times 1$) on a subcarrier where an index corresponds to k and $z_k$ corresponds to a noise signal vector (($N_r \times 1$) on a subcarrier where an index corresponds to k.

And, the subcarrier index k has values ranging from 0 to $N_{FFT} - 1$. In this case, the $N_{FFT}$ is a FFT (Fast Fourier Transform) size and corresponds to the number of total subcarriers. And, $N_{RF}$ indicates the number of total RF chains, $N_t$ indicates the number of total antennas of a transmitting end, and $N_t$ corresponds to the number of transmission antennas installed according to an RF chain. Lastly, $N_r$ indicates the number of total antennas of a receiving end and $N_s$ indicates the number of transmission data streams.

Meanwhile, if the equation 8 is developed for a subcarrier k, it can be represented as equation 9 in the following.

$$\begin{bmatrix} y^{(1)} \\ \vdots \\ y^{(N_r)} \end{bmatrix} = \begin{bmatrix} h_{11} & h_{12} & \cdots & h_{1N_t} \\ h_{21} & h_{22} & \cdots & h_{2N_t} \\ \vdots & \vdots & \ddots & \vdots \\ h_{N_r1} & h_{N_r2} & \cdots & h_{N_rN_t} \end{bmatrix} \quad \text{[Equation 9]}$$

$$F^{RF} \begin{pmatrix} \begin{bmatrix} v_{1,1} & v_{1,2} & \cdots & v_{N_{RF},N_S} \\ v_{2,1} & v_{2,2} & \cdots & v_{N_{RF},N_S} \\ \vdots & \vdots & \ddots & \vdots \\ v_{N_{RF},1} & v_{N_{RF},2} & \cdots & v_{N_{RF},N_S} \end{bmatrix} \begin{bmatrix} x^{(1)} \\ \vdots \\ x^{(N_S-1)} \end{bmatrix} \end{pmatrix} +$$

$$\begin{bmatrix} z^{(1)} \\ \vdots \\ z^{(N_r)} \end{bmatrix}$$

In this case, an equivalent precoding matrix $F^{RF}$ ($N_t \times N_R$) of analog beamforming formed by a phase shifter and a power amplifier after an RF chain can be represented as equation 10 in the following.

$$F^{RF} = \begin{bmatrix} w^1_{N_t^{RF}} & 0 & 0 & \cdots & 0 \\ 0 & w^2_{N_t^{RF}} & 0 & \cdots & 0 \\ 0 & 0 & w^3_{N_t^{RF}} & \cdots & 0 \\ \vdots & \vdots & \vdots & \ddots & \vdots \\ 0 & 0 & 0 & \cdots & w^{N_{RF}}_{N_t^{RF}} \end{bmatrix} \quad \text{[Equation 10]}$$

And, a weight per RF chain of an RF precoder $F^{RB}$ can be represented as equation 11 in the following.

$$w^j_{N_t^{RF}} = \begin{bmatrix} w^j_1 \\ w^j_2 \\ \vdots \\ w^j_{N_t^{RF}} \end{bmatrix} \quad \text{[Equation 11]}$$

In the following, a beam radiation pattern of hybrid beamforming for a ULA (uniform linear array) antenna is explained. An array response vector of the ULA antenna can be represented as equation 12 in the following.

$$a(\theta) = \left[1 \ \exp\left(j2\pi \times 1 \times \frac{d}{\lambda}\sin(\theta)\right) \ \exp\left(j2\pi \times 2 \times \frac{d}{\lambda}\sin(\theta)\right) \ \ldots \ \exp\left(j2\pi \times (N_t - 1) \times \frac{d}{\lambda}\sin(\theta)\right)\right]^T \quad \text{[Equation 12]}$$

In equation 12, $\lambda$ corresponds to a wave-length and d indicates a distance between antennas. In order to represent an antenna radiation pattern of a hybrid beamformer, for clarity, assume that the number of RF chains corresponds to 4 and the number of analog antennas per RF chain corresponds to 4.

Figure 6:
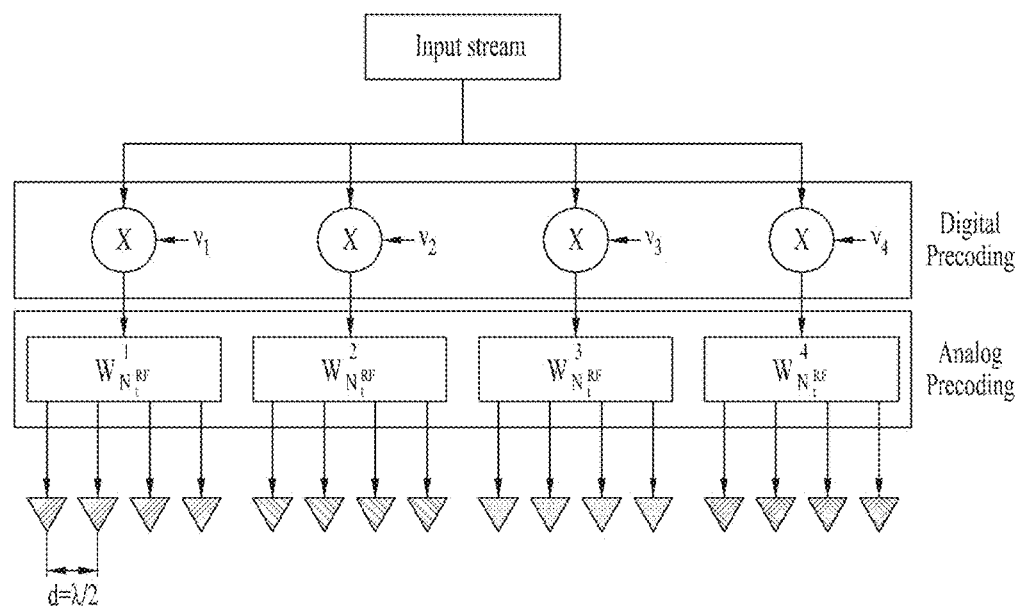
FIG. 6 is a diagram for 16 ULA antenna structure consisting of 4 RF chains.

FIG. 6 is a diagram for 16 ULA antenna structure consisting of 4 RF chains. In particular, in FIG. 6, the total number of transmission antennas corresponds to 16 and it becomes d=$\lambda$/2. A phase shifter and a power amplifier of an analog terminal can be represented by a beamforming weight, i.e., a precoder. The precoder can be represented as equation 13 in the following.

$$F^{RF} = \begin{bmatrix} w^1_{N_t^{RF}} & 0 & 0 & 0 \\ 0 & w^2_{N_t^{RF}} & 0 & 0 \\ 0 & 0 & w^3_{N_t^{RF}} & 0 \\ 0 & 0 & 0 & w^4_{N_t^{RF}} \end{bmatrix}, \quad \text{[Equation 13]}$$

$$w^j_{N_t^{RF}} = \begin{bmatrix} w^j_1 \\ w^j_2 \\ w^j_3 \\ w^j_4 \end{bmatrix}$$

In order to derive a beam pattern from a direction of a main lobe center of a radio wave radiated from an antenna, i.e., boresight, a beam shift angle is set to 0°. Hence, all weight vectors of an analog precoding matrix have an element of a value of 1. In this case, a rank 1 weight vector to be randomly applied in a digital beamforming stage is defined as equation 14 in the following:

$$F^{BB} = v_1 = [v_1 v_2 v_3 v_4]^T$$

In the boresight ($\theta=0°$), all antenna array response vectors to which digital beamforming of equation 13 is applied can be represented as equation 15. In this case, a distance d between antennas is assumed as $\lambda/2$.

$$\sum a(\theta) = \sum_{i=0}^{15} a_i(\theta) = (1 + \exp(j\pi \times \sin(\theta)) + \quad \text{[Equation 15]}$$
$$\exp(j\pi 2 \times \sin(\theta)) + \exp(j\pi 3 \times \sin(\theta))) \times v_1 +$$
$$(\exp(j\pi 4 \times \sin(\theta)) + \exp(j\pi 5 \times \sin(\theta)) +$$
$$\exp(j\pi 6 \times \sin(\theta)) + \exp(j\pi 7 \times \sin(\theta))) \times v_2 +$$
$$(\exp(j\pi 8 \times \sin(\theta)) + \exp(j\pi 9 \times \sin(\theta)) +$$
$$\exp(j\pi 10 \times \sin(\theta)) + \exp(j\pi 11 \times \sin(\theta))) \times v_3 +$$
$$(\exp(j\pi 12 \times \sin(\theta)) + \exp(j\pi 13 \times \sin(\theta)) +$$
$$\exp(j\pi 14 \times \sin(\theta)) + \exp(j\pi 15 \times \sin(\theta))) \times v_4$$

It may be able to derive a result such as equation 16 from the equation 15.

$$\sum a(\theta) = (1 + \exp(j\pi \times \sin(\theta)) + \exp(j\pi 2\sin(\theta)) + \quad \text{[Equation 16]}$$
$$\exp(j\pi 3\sin(\theta))) \times (v_1 + \exp(j\pi 4\sin(\theta)) \cdot v_2 +$$
$$\exp(j\pi 8\sin(\theta)) \cdot v_3 + \exp(j\pi 12\sin(\theta)) \cdot v_4)$$
$$= \left(\sum_{i=1}^{4} s_i\right) \times \left(\sum_{i=1}^{4} t_i\right) = \sum s \times \sum t$$

In equation 16, s corresponds to a beam boundary vector and can be represented as equation 17 in the following. And, in equation 16, t corresponds to a beam gain/coordination vector and can be represented as equation 18 in the following.

$$s = \begin{bmatrix} 1 \\ e^{j\pi \sin(\theta)} \\ e^{j\pi 2\sin(\theta)} \\ e^{j\pi 3\sin(\theta)} \end{bmatrix} \quad \text{[Equation 17]}$$

$$t = \begin{bmatrix} 1 & 0 & 0 & 0 \\ 0 & e^{j\pi 4\sin(\theta)} & 0 & 0 \\ 0 & 0 & e^{j\pi 8\sin(\theta)} & 0 \\ 0 & 0 & 0 & e^{j\pi 12\sin(\theta)} \end{bmatrix} \begin{bmatrix} v_1 \\ v_2 \\ v_3 \\ v_4 \end{bmatrix} \quad \text{[Equation 18]}$$

In this case, the beam boundary vector s determines the total valid range. And, a range of the digital beamforming is restricted to a corresponding region as well.

Figure 7:
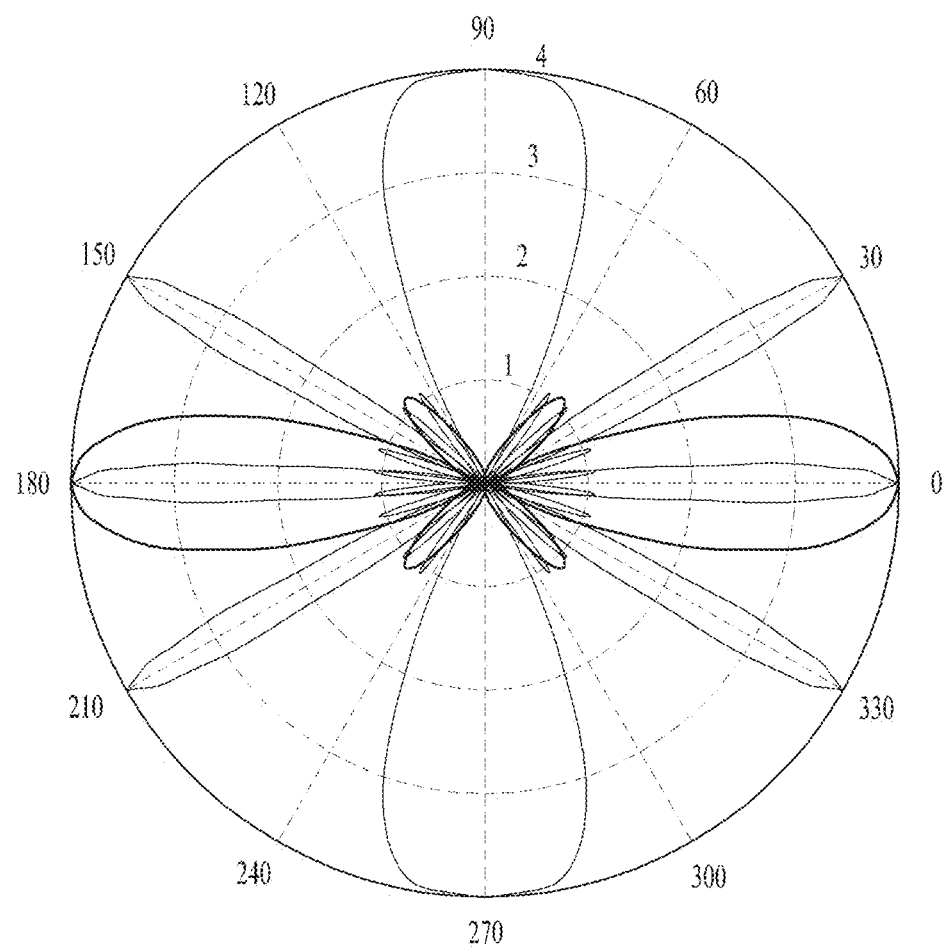
FIG. 7 is a diagram for beam patterns of a beam boundary vector and a beam coordination vector.

FIG. 7 is a diagram for beam patterns of a beam boundary vector and a beam coordination vector. In particular, FIG. 7 assumes N=16, $N_t^{RF}=4$, $N_{RF}=4$. A beam pattern of the beam boundary vector is expressed by a thick line and a beam pattern of the beam coordination vector is expressed by a thin line.

Figure 8:
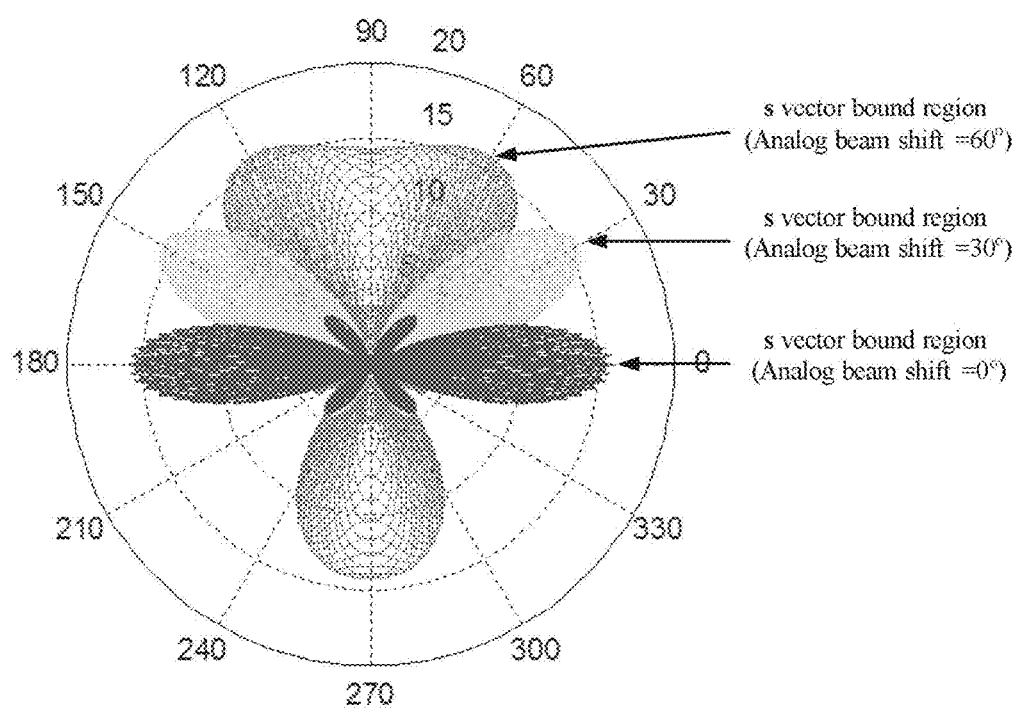
FIG. 8 is a diagram for a beam pattern of a final antenna array response vector according to analog beam shift.

FIG. 8 is a diagram for a beam pattern of a final antenna array response vector according to analog beam shift. Similarly, FIG. 8 assumes $N_t=16$, $N_t^{RF}=4$, $N_{RF}=4$. In FIG. 8, an accumulated beam pattern result to which $v_1=[v_1\ v_2\ v_3\ v_4]^T$ for determining digital beamforming is applied is shown.

Referring to FIGS. 7 and 8, it is able to see that a range of a valid beam is restricted by a beam boundary vector s.

As mentioned in the foregoing description, beamforming of an analog stage is determined by a specific direction by fixing $F^{RF}$. Although all $F^{BB}=v$ are applied to digital beamforming, a beam pattern is restricted by the beam boundary vector s. Hence, a UE is able to anticipate a precise direction through a difference between beam gains formed by a reference beam gain and a boundary beam gain.

Figure 9:
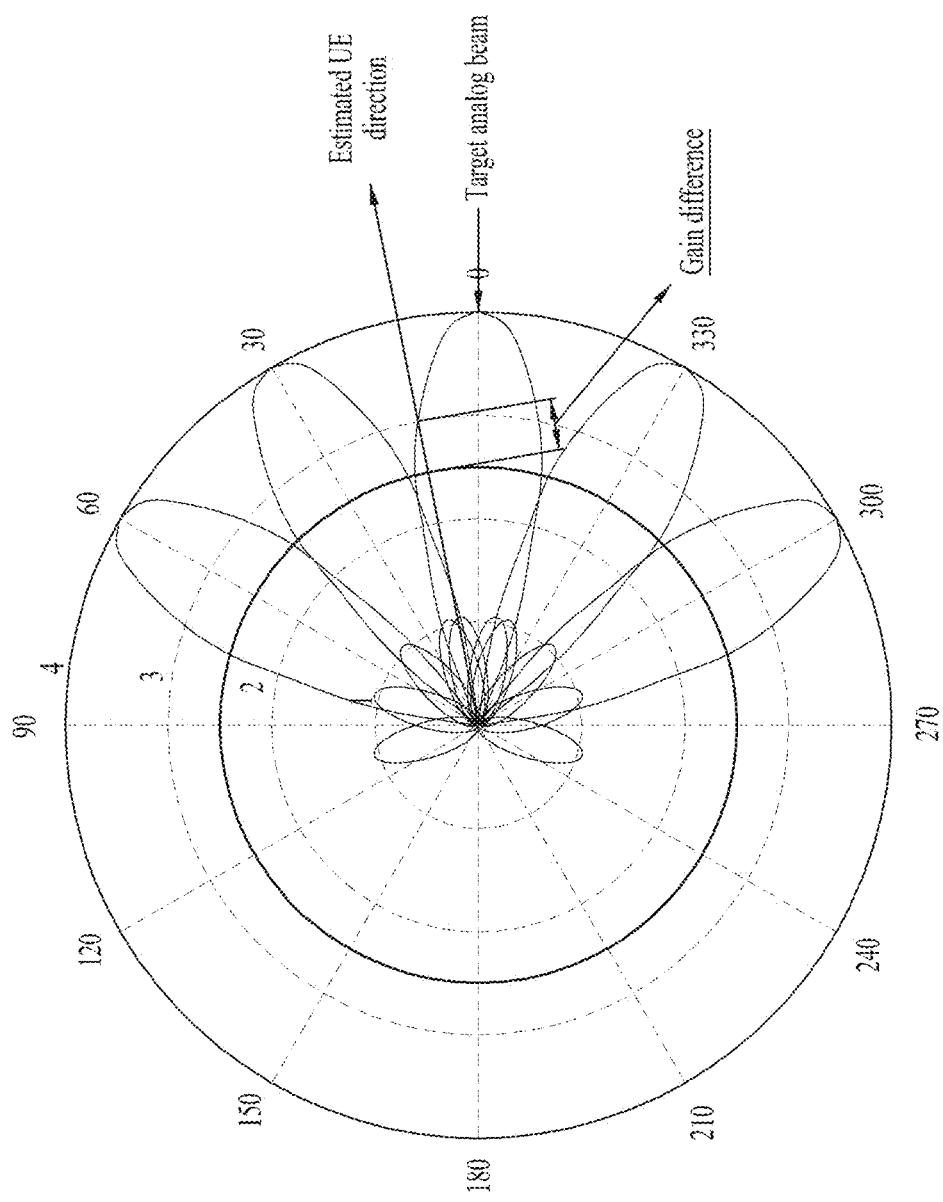
FIG. 9 is a diagram for an example of calculating a difference between an analog beam gain and a reference beam gain.

FIG. 9 is a diagram for an example of calculating a difference between an analog beam gain and a reference beam gain.

Referring to FIG. 9, first of all, beams $F^{RF}=0°$, ±30°, ±60° are formed by analog beamforming and a gain different from a reference beam is calculated in the beams.

In this case, a base station periodically transmits a reference beam. Since it is necessary for the reference beam to have a uniform gain in all directions, it is ideal to follow a beam shape of an omni-antenna. A UE may obtain a gain difference estimated from a corresponding position through equation 19 in the following.

$$G_{diff}=G_{mea}-G_{ref}(dB) \quad [\text{Equation 19}]$$

The present invention proposes a method capable of performing more adaptive beamforming by estimating mobility of a UE using the aforementioned gain difference.

If a beam gain difference value estimated from a UE changes, it indicates that a channel is changing on a time axis. Hence, a base station recognizes the change of the channel to appropriately perform beamforming on the UE. However, when legacy feedback-based beamforming is performed, since it is unable for the base station to estimate a channel between reporting intervals, the base station is unable to recognize a tendency of a time-varying channel. And, since a feedback reporting interval is configured to have a prescribed time interval in general, a beam may head towards unintended direction due to delay between feedbacks when a closed-loop-based minute beamforming is performed.

Consequently, when the legacy beamforming process is applied as it is, it is unable to recognize a channel change between reporting intervals of a beam gain difference value. In case of performing hybrid beamforming, since analog beamforming configuration requires a training section equal to or longer than a prescribed period in time, there exists a restriction in frequently updating a short-term period. And, when closed-loop beamforming is reconfigured with a UE, long time delay and high complexity occur in case of searching for a beamforming coefficient or an analog/digital PMI.

When a method of replacing PMI is performed using a gain difference between a reference beam estimated from a UE and a measured beam, the present invention proposes to perform beam prediction according to environment, switching, analog boundary beam change, and the like in accordance with mobility of the UE. By doing so, it is able to solve the aforementioned problem of the legacy beamforming process.

Embodiment 1

First of all, it may consider that a UE measures a change amount of a beam gain difference between analog reference signals and feedbacks the change amount to a base station in the first embodiment of the present invention.

In general, a UE performs CSI feedback according to a configuration period or signaling of a base station. Therefore, information on a channel change amount is not transmitted to the base station between the CSI feedbacks. According to the present proposal, a change amount of the beam gain difference mentioned earlier in equation 19 is consistently measured and a value of the change amount is fed back in a periodic or an aperiodic form (e.g., the value is reported only when the change amount is equal to or greater than a specific threshold). By doing so, the base station can measure mobility of the UE or channel variability. In this case, an example of a change amount of a gain difference capable of being measured by the UE is shown in the following.

1) Beam gain difference $G_{diff}$ distribution or standard deviation value over specific time interval (refer to equation 20 in the following)

$$\frac{1}{T}\sum_{t=T_0}^{T_0+T-1}(G_{diff,t}-E\{G_{diff}\})^2 \quad [\text{Equation 20}]$$

Where, $E\{G_{diff}\} = \frac{1}{T}\sum_{t=T_0}^{T_0+T-1} G_{diff,t}$ or $$E\{G_{diff}\} = \frac{1}{T_0+T-1}\sum_{t=1}^{T_0+T-1} G_{diff,t},$$

measurement time index, $T_0$: measurement start time, T: measurement duration

2) Variation of beam gain difference $G_{diff}$ over specific time interval (refer to equation 21 in the following)

$$\left|G_{diff,T_1}-G_{diff,T_0}\right| \quad [\text{Equation 21}]$$

Where, $T_0$: reference time, $T_1$: reporting time

In this case, $T_1=T_0+T_c$ and $T_c$ corresponds to a constant value.

3) Variation of a beam gain difference $G_{diff}$ to which weight is applied (refer to equation 22 in the following)

$$\left|\sum_{t=T_0+1}^{T_1} w_t(G_{diff,t}-G_{diff,t-1})\right| \quad [\text{Equation 22}]$$

Where, $w_t$ corresponds to a weight value at time t.

4) Variation of SNR average value (refer to equation 23 in the following)

$$\frac{1}{T}\left|\sum_{t=T_2}^{T_2+T-1} G_{diff,t} - \sum_{t=T_0}^{T_0+T-1} G_{diff,t}\right| \quad \text{[Equation 23]}$$

Where, $T_2+T-1$=reporting time $T_1$

Figure 10:
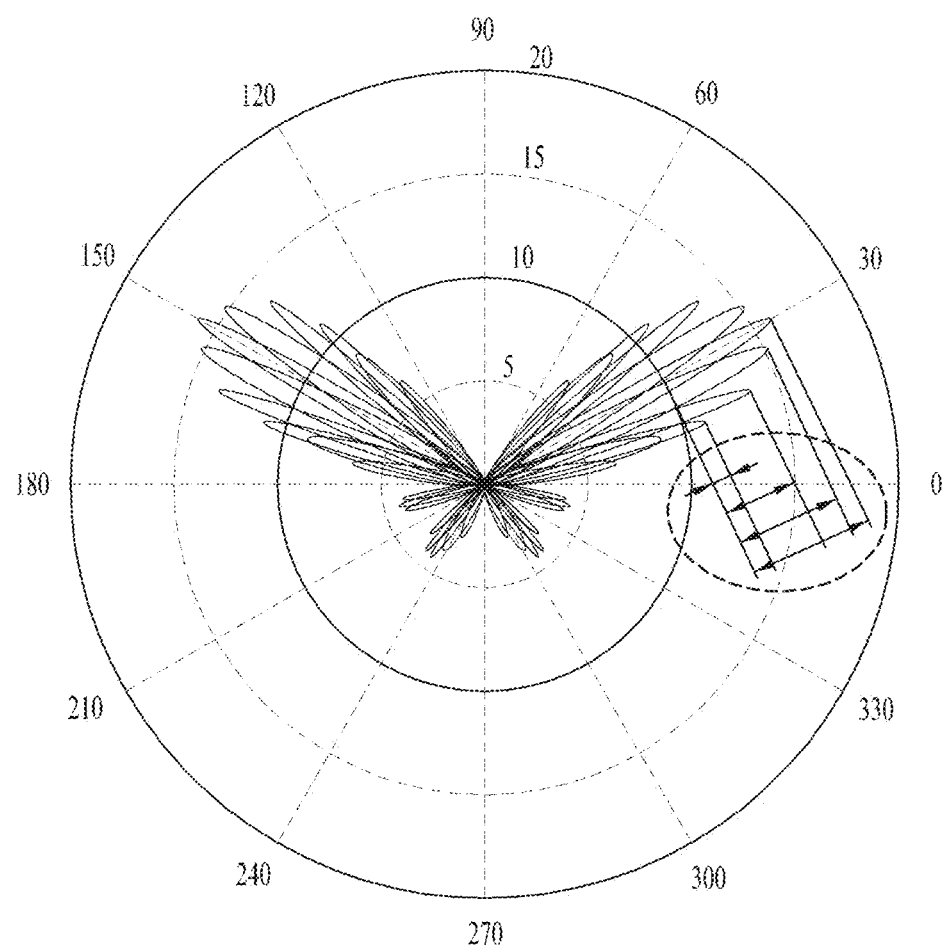
FIG. 10 is a diagram for a different example of calculating a difference between an analog beam gain and a reference beam gain.

Meanwhile, when an amount of change of a beam gain is estimated, a beam gain difference is measured based on the aforementioned equation 19. In this case, due to the characteristic of a beam pattern, the amount of change of the beam gain difference increases according to an identical change angle as getting far from boresight direction. FIG. 10 is a diagram for a different example of calculating a difference between an analog beam gain and a reference beam gain. Referring to FIG. 10, it is able to see that an amount of change according to an identical change angle increases as getting far from boresight direction.

Hence, in order to precisely estimate an amount of change of a beam gain difference, it may be necessary to perform linear correction on a beam pattern of a round shape. For example, as a correction value for linearizing a beam gain difference, a relatively small weight is assigned to maximum $G_{diff}$ and a greatest weight is assigned to minimum $G_{diff}$=0 dB. For example, it may be able to configure such weights shown in Table 2 in the following. As a result, it may be able to perform linearization on a gain difference by configuring a weight to be appropriate for a beam pattern.

TABLE 2

| Analog beam index (beam ID) | Gain difference (dB) | Weighted Gain difference |
|---|---|---|
| Beam #1 (Boresight = 0°) | $G_1$ | $G_1' = w_1 G_1$ |
| | $G_2$ | $G_2' = w_2 G_2$ |
| | . | . |
| | . | . |
| | . | . |
| | $G_L$ | $G_L' = w_L G_L$ |
| Beam #2 (Boresight = 30°) | $G_1$ | $G_1' = w_1 G_1$ |
| | $G_2$ | $G_2' = w_2 G_2$ |
| | . | . |
| | . | . |
| | . | . |
| | $G_L$ | $G_L' = w_L G_L$ |
| . | . | . |
| . | . | . |
| . | . | . |

Meanwhile, a UE estimates mobility of the UE or channel variation based on a correction value of a beam gain difference. If linearization correction on the aforementioned weight is performed, the mobility of the UE can be estimated through a difference of a change amount between gain differences, i.e., an inclination value. In particular, when beamforming is performed, the mobility of the UE can be estimated in advance through a rate of change of a change between beams.

For example, in the same gain difference reporting period $T_1$ of Table 2, if a corrected gain difference is changing like $G'_1 \rightarrow G'_2 \rightarrow G'_3 \rightarrow G'_4 \ldots$, it is defined as medium mobility. If the corrected gain difference is changing like $G'_1 \rightarrow G'_1 \rightarrow G'_1 \rightarrow G'_1 \ldots$, it is defined as low mobility. Similarly, if the corrected gain difference is changing like $G'_1 \rightarrow G'_3 \rightarrow G'_5 \rightarrow G'_5$ in the period $T_1$, it can be defined as high mobility.

Embodiment 2

In the second embodiment of the present invention, it may consider that a base station makes a prediction for a target analog beam using a beam gain difference and information on an amount of change of a beam gain fed back from a UE and the base station preferentially performs beam switching.

As mentioned in the foregoing description, in hybrid beamforming, a coarse range for digital beamforming is fixed in consideration of decomposition capability and complexity of analog beamforming. A valid control range for the digital beamforming is also converged into an analog beam boundary pattern. In particular, the analog beam boundary pattern has a limitation in control flexibility compared to the digital beam and it is difficult to perform radical beam switching.

Therefore, it is necessary to have analog beam switching for a fast moving UE, which deviates from a specific analog beam boundary pattern, and analog beam switching in accordance with mobility of a UE prior to the feedback from the UE. In this case, it is able to make a prediction for the analog beam switching using an amount of change of a beam gain difference fed back from the UE and it is able to perform switching and controlling on an analog beam in advance.

Figure 11:
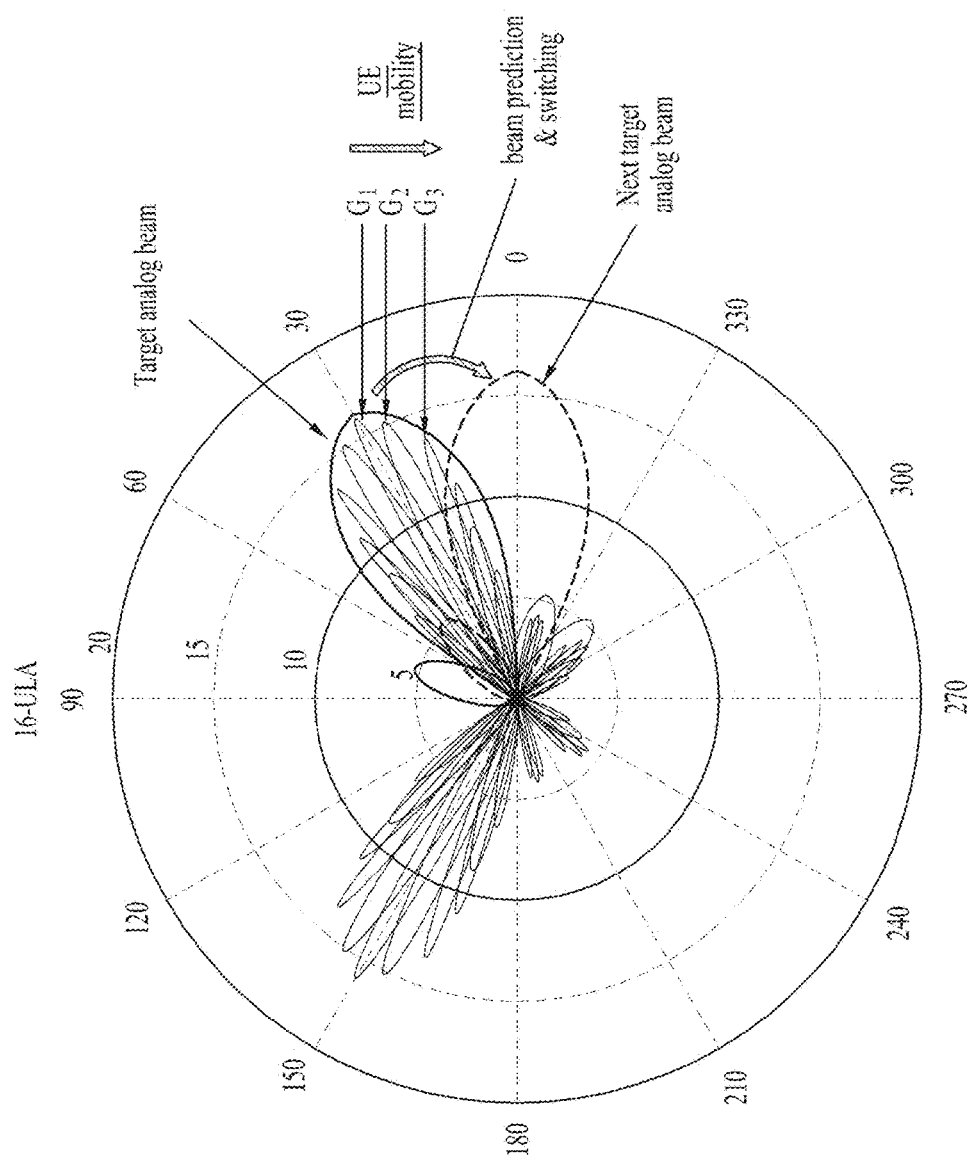
FIG. 11 is a diagram for an example of estimating mobility of a UE using a change amount of a gain difference according to embodiment of the present invention.

For example, when mobility of a UE is defined by an amount of change of a beam gain difference based on Table 2, if a corrected gain difference value is changing like $G'_1 \rightarrow G'_3 \rightarrow G'_5 \rightarrow G'_7 \ldots$ in the period $T_1$, since the beam gain difference is considerably close to 0 dB, it may preferentially switch to a next analog beam. FIG. 11 is a diagram for an example of estimating mobility of a UE using a change amount of a gain difference according to embodiment of the present invention.

Referring to FIG. 11, since a UE moves towards a corresponding direction, a base station can stably switch into a next analog beam without feedback of the UE.

The aforementioned beam prediction technique can be used for determining not only an analog beam but also a digital beam (or a precoder). In particular, it may be able to make a prediction for a change of a beam based on a moving direction and speed of a UE to maximize a gain.

Embodiment 3

A method of determining a type of a digital precoder using beam gain difference change amount information is proposed in the third embodiment of the present invention.

A UE or a base station, which has received the feedback information, can determine a type of digital precoding using the beam gain difference change amount information. For example, if a beam gain difference change amount is big, it can be determined as a channel change amount of the UE is big. Hence, it may be able to apply an open loop transmission technique. Otherwise, it may be able to apply a closed-loop transmission technique.

As a different example, a width of a transmission beam can be controlled based on a beam gain change amount. As a method for controlling a width of a transmission beam, it may control a transmission antenna subset. Or, it may apply codebook cycling or random beamforming based on a restricted codebook. In this case, it may control a size of a codebook to be applied or a range of AoD (angle of departure) included in the codebook to be applied.

Embodiment 4

The present invention can be utilized for measuring variation in vertical and horizontal direction for 3D beamforming.

First of all, a channel gain difference change amount is measured for horizontal direction and vertical direction, respectively. This is because a channel gain difference for a vertical/horizontal beam is identical to PMI estimation for a vertical/horizontal beam in the aspect of a UE.

When a reference beam is generated in 3D beamforming environment, it may use a legacy vertical and horizontal beam. In particular, a base station generates a horizontal reference beam though a vertical beam and a UE can determine a horizontal direction reference beam gain through an estimated beam gain value during vertical beam training time. On the other hand, it may be able to obtain vertical reference beam gain information through a horizontal beam.

Figure 12:
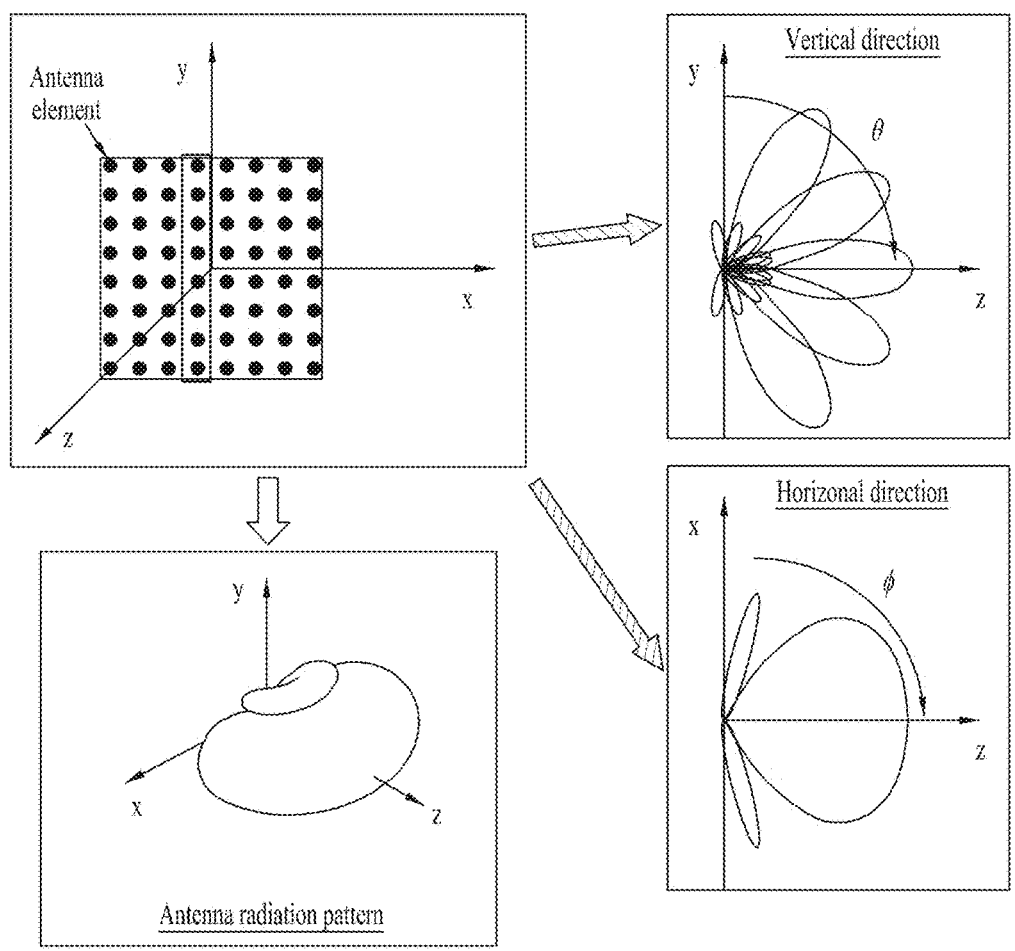
FIG. 12 is a diagram for a shape of a horizontal beam pattern when beamforming is performed in vertical direction according to embodiment of the present invention.

FIG. 12 is a diagram for a shape of a horizontal beam pattern when beamforming is performed in vertical direction according to embodiment of the present invention.

Referring to FIG. 12, if a beam is radiated using a vertical direction antenna only among the total antenna array, since a beam is not formed in horizontal direction, a beam of a round form is formed in all directions. A base station radiates vertical beams according to a coordination angle and a UE obtains a beam gain value of a form having the greatest gain among the beams. In this case, the beam gain obtained by the UE in horizontal direction is theoretically the same irrespective of a location at which the UE is located in horizontal direction, it is able to see that the beam is identical to a form of omni-antenna beam in horizontal direction. Therefore, it may be able to implement a reference beam in horizontal direction and the UE is able to estimate a gain of the reference beam.

Although a hybrid beamforming structure is assumed and described in the present invention, application of the present technique is not restricted by the hybrid beamforming structure. As an example, the present technique can also be applied to a form that the analog beamforming end is replaced with the digital beamforming end in FIG. 6. In particular, the present technique can also be applied to a digital beamforming form having a hierarchical structure via antenna sub grouping.

And, the aforementioned proposal is described on the basis of a downlink scenario that a base station transmits a signal to a UE, by which the present invention may be non-limited. The present technique can be applied to a combination of a random transmitter and a receiver. For example, the technique can be applied to an uplink scenario that a UE transmits a signal to a base station, a scenario that a signal is transmitted between UEs, and a scenario that a signal is transmitted between base stations.

Figure 13:
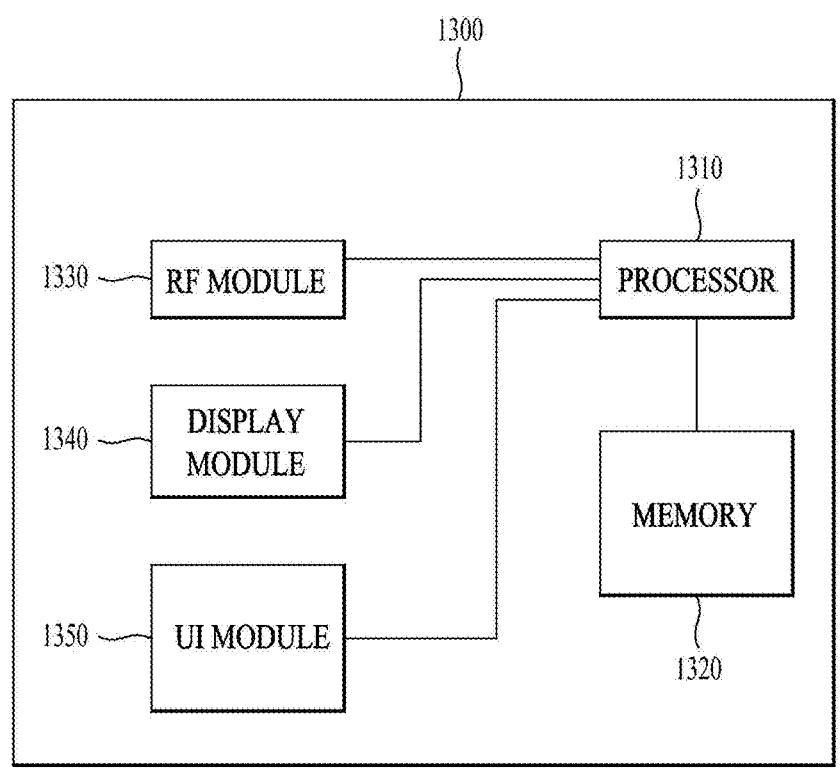
FIG. 13 is a block diagram of a communication apparatus according to one embodiment of the present invention.

FIG. 13 is a block diagram of a communication apparatus according to one embodiment of the present invention.

Referring to FIG. 13, a communication apparatus 1300 includes a processor 1310, a memory 1320, a Radio Frequency (RF) module 1330, a display module 1340 and a user interface module 1350.

The communication apparatus 1300 is shown for convenience of description and some modules thereof may be omitted. In addition, the communication apparatus 1300 may further include necessary modules. In addition, some modules of the communication apparatus 1300 may be subdivided. The processor 1310 is configured to perform an operation of the embodiment of the present invention described with reference to the drawings. For a detailed description of the operation of the processor 1310, reference may be made to the description associated with FIGS. 1 to 12.

The memory 1320 is connected to the processor 1310 so as to store an operating system, an application, program code, data and the like. The RF module 1330 is connected to the processor 1310 so as to perform a function for converting a baseband signal into a radio signal or converting a radio signal into a baseband signal. The RF module 1330 performs analog conversion, amplification, filtering and frequency up-conversion or inverse processes thereof. The display module 1340 is connected to the processor 1310 so as to display a variety of information. As the display module 1340, although not limited thereto, a well-known device such as a Liquid Crystal Display (LCD), a Light Emitting Diode (LED), or an Organic Light Emitting Diode (OLED) may be used. The user interface module 1350 is connected to the processor 1310 and may be configured by a combination of well-known user interfaces such as a keypad and a touch screen.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be varied. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this document, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of transmitting a signal by a transmitting end in a wireless communication system, the method comprising:
    transmitting a first reference signal for providing a reference beam uniform in all directions and a second reference signal for providing a boundary beam heading towards a predetermined direction to a receiving end;
    receiving feedback information on a difference value between a gain of the reference beam and a gain of the boundary beam from the receiving end;
    estimating mobility information of the receiving end based on a change amount of the difference value; and
    performing beamforming for transmitting a signal to the receiving end using the mobility information.

2. The method of claim 1, wherein the difference value between the gain of the reference beam and the gain of the boundary beam is equal to or greater than a threshold value.

3. The method of claim 1, wherein a weight value is applied to the difference value between the gain of the reference beam and the gain of the boundary beam based on the predetermined direction.

4. The method of claim 1, wherein the beamforming is performed in a direction to which the receiving end moves by controlling a phase shifter and a power amplifier contained in an antenna of the transmitting end.

5. The method of claim 1, wherein the feedback information is periodically received from the receiving end.

6. A method of receiving a signal by a receiving end in a wireless communication system, the method comprising:
    receiving a first reference signal for providing a reference beam uniform in all directions and a second reference signal for providing a boundary beam heading towards a predetermined direction from a transmitting end;
    transmitting feedback information on a difference value between a gain of the reference beam and a gain of the boundary beam to the transmitting end; and
    receiving a signal beamformed based on mobility information of the receiving end from the transmitting end,
    wherein the mobility information is estimated by the transmitting end based on the feedback information.

7. The method of claim 6, wherein the transmitting the feedback information comprises transmitting the feedback information if the difference value between the gain of the reference beam and the gain of the boundary beam is equal to or greater than a threshold value.

8. The method of claim 6, further comprising applying a weight value to the difference value between the gain of the reference beam and the gain of the boundary beam,
    wherein the weight value is determined based on the predetermined direction.

9. The method of claim 6, wherein the beamformed signal is obtained by performing beamforming in a direction to which the receiving end moves by controlling a phase shifter and a power amplifier contained in a transmission antenna of the transmitting end.

10. The method of claim 6, wherein the feedback information is periodically transmitted from the transmitting end.

* * * * *